Figure 1:
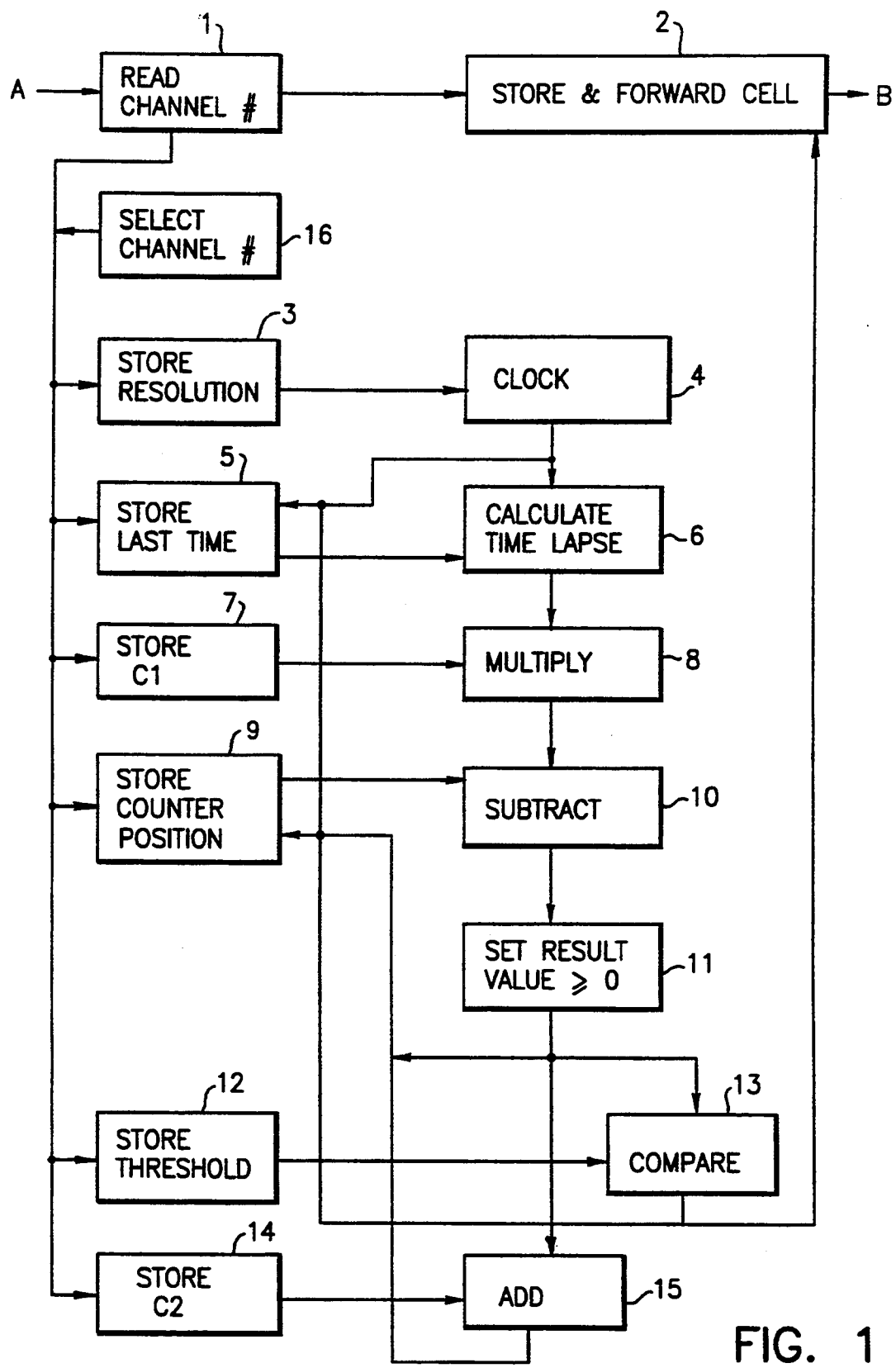

United States Patent [19]

Feijen et al.

[11] Patent Number: 5,361,253
[45] Date of Patent: Nov. 1, 1994

[54] ATM POLICING FUNCTION WITH AUTONOMOUS REFERENCE TIME INSTANTS

[75] Inventors: Maurice M. Feijen, Rijswijk; Jacob C. van der Wal, Ve Delft, both of Netherlands

[73] Assignee: Koninklijke PTT Nederland N.V., Groningen, Netherlands

[21] Appl. No.: 15,638

[22] Filed: Feb. 9, 1993

[30] Foreign Application Priority Data

Feb. 12, 1992 [NL] Netherlands ............... 9200253

[51] Int. Cl.$^5$ .................................... H04J 3/14
[52] U.S. Cl. ................................. 370/17; 370/94.1
[58] Field of Search ............... 370/60, 17, 13, 94.1

[56] References Cited

U.S. PATENT DOCUMENTS 4,484,326 11/1984 Turner ........................ 370/94.1
4,807,224 2/1989 Naron et al. ................. 370/94.1

FOREIGN PATENT DOCUMENTS

0381275A1 8/1990 European Pat. Off. .
2665313A1 1/1992 France .

Primary Examiner—Douglas W. Olms
Assistant Examiner—Min Jung
Attorney, Agent, or Firm—Frishauf, Holtz, Goodman & Woodward

[57] ABSTRACT

Method of transferring, via a transmission medium comprising asynchronously time-division-multiplexed transmission channels, a data stream comprised of data cells. A monitoring apparatus at the beginning of the transmission medium stores, for each transmission channel, a counter position (variable) which, when a data cell arrives at the monitoring apparatus, is amended as a function of time which has elapsed from a reference time instant. Depending on the amended counter position and a threshold value, the data cell is granted or refused access to the downstream transmission medium. The reference time instant is determined by the monitoring apparatus completely or at least partly, independent of the time instant of the appearance of the data cells. A first option provides for the monitoring apparatus to shift the reference time instant in time in accordance with a fixed sequence schedule. According to a second option, the reference time instant is shifted in time in accordance with a fixed time schedule. The method brings about a reduction in memory capacity.

3 Claims, 2 Drawing Sheets

ATM POLICING FUNCTION WITH AUTONOMOUS REFERENCE TIME INSTANTS

BACKGROUND OF THE INVENTION

The invention relates to a method of transferring, via a transmission medium comprising a plurality of virtual, asynchronously time-division-multiplexed transmission channels, a data stream fed to said transmission medium and composed of dam cells which are each transferred via one of said transmission channels and which each contain a channel designation indicating the transmission channel via which said dam cell has to be transferred, in which method a monitoring apparatus at the beginning of the transmission medium stores, for each transmission channel, a variable value which, when a data cell arrives at said monitoring apparatus, is amended as a function of the time which has elapsed from a reference time instant known to the monitoring apparatus, which amended variable value is then compared with a threshold value and, depending on the amended variable value and said threshold value, access to the downstream transmission medium is granted or refused to said data cell.

Such a method is disclosed inter alia, by EP-381275 in the name of the Applicant. In the latter, to achieve a time-division-multiplexed usage of a 'leaky-bucket' monitoring apparatus, the time difference between the arrival time instant of the penultimate dam cell and the arrival time instant of the last data cell to arrive from the same channel is always calculated on the arrival of a data cell. Said time difference is then multiplied by a constant 'leakage' value and the result thereof is subtracted from the variable value which is stored in the memory and which will also be designated hereinafter as 'counter position'. The counter position is further amended by increasing it by a constant value. The result is compared with a threshold value. If the counter position is not higher than the threshold value, the data cell is allowed through to the transmission medium. The updated counter position is stored in the memory as the new counter position. In addition to the counter position, however, the time instant of the appearance of the last data cell is also stored in order to be able to update the counter position on the appearance of a subsequent data cell from the same channel. In the known method, the reference time instant, which is intended for determining the time which has elapsed, on the basis of which the counter position is amended, is therefore always and exclusively formed by the time instant of the arrival of the penultimate data cell (allowed through); in the known method, the monitoring apparatus is therefore 'passive' as regards the reference time instant.

Since in practice a large number of channels (for example, 1024) is involved, it is desirable to limit the storage of variables to a minimum, and it is to this that the present invention intends to form a contribution.

SUMMARY OF THE INVENTION

The invention is based on the insight that storage capacity (memory space) can be saved by shifting a reference time instant not only in time when a data cell appears (and is allowed through) but also (or even exclusively) at a time instant to be determined autonomously by the monitoring apparatus. Two effects may occur in this connection which limit the memory space. If the reference time instant is fixed a priori as a parameter, it is no longer necessary to reserve memory space for the storage thereof (but it is, of course, for the counter positions applying at said reference time instants). A second effect is that, if the counter positions are amended not only when a data cell appears but also 'in-between', the counter positions, and also the 'clock positions', in which the reference time instants are expressed, do not have the possibility of becoming excessively large. As a result of regularly shifting the reference time instants, the clock positions and the counter positions are, as it were, regularly reset, by a value known to monitoring apparatus. In this process, the reference time instant is primarily modified and the counter position is corrected on the basis of the 'leakage function'.

The invention comprises a method of the type specified above, characterized in that the reference time instant is determined by the monitoring apparatus in a complete or at least partial independency of the time instants of the appearance of the data cells. In contrast to the known method, the reference time instant is therefore not, or at any rate not exclusively, set by the instant of appearance of said data cells, but the monitoring apparatus has an autonomous function therein.

Thus, it is possible for the autonomous update time instants to be variable time instants, both the updated counter position at such an update time instant and a time designation of the update time instant continuously being stored as variables in the memory. This option has, per se, the advantage that the 'updating' of the counter position can take place at instants when processor capacity is available therefor, for example in periods having a supply of data cells which is not very high. The clock position of the update time instant must in this case, however, in fact be stored as a variable in the memory, and this is again a disadvantage in itself.

An option in which it is unnecessary to store the updated clock position in the memory as a variable provides for the autonomous updates to take place in accordance with a previously known and fixed pattern, in which case only the updated counter position is stored as a variable in the memory at such update time instants. In the simplest form, said updates take place at fixed intervals. If, for example, the time slots in which the data cells appear at the monitoring apparatus are numbered, the update for each channel number can readily take place in the time slot having the corresponding number. More advanced update schedules in which certain channels (for example channels having a high 'leakage' value) are updated more often than other channels offer additional savings, but at the expense of increased complexity.

An extreme case of the above option is formed by the possibility of choosing, on initialization of the monitoring apparatus, one fixed reference time instant which no longer undergoes any further alteration. A disadvantage is that the counter position, calculated back to the reference time instant, becomes ever greater. That is why the preceding option, in which the reference time instant is continuously shifted, is preferred.

To update the counter positions in response to the appearance of data cells at the input of the monitoring apparatus, there are two options. A first option provides that the counter position is also amended (reduced and increased), as mentioned, when a data cell appears at the monitoring apparatus and that, at least if access is granted, the amended counter position and the clock position of the time instant of the appearance are stored as variables in the memory. This option has the drawback that, in addition to the counter position, the time instant of the appearance is also stored.

A preferred option provides that, when a data cell appears at the monitoring apparatus, the counter position is also reduced and increased and that a decision is taken about whether the data cell is admitted or not, after which, at least if access is granted, the stored counter position is increased by the said constant value and is stored in the memory as the new counter position. The counter position is reduced as a function of time, however, only at the first succeeding update time instant. This option can be used, in particular, in combination with the above-mentioned option, the update time instants being arranged in a fixed pattern and the update time instants being fixed time instants which are either permanently built into the system or are stored in a memory as a parameter. At such, a priori known time instants, only the updated counter position is therefore continuously stored in the memory as a variable.

With regard to the permanently set update time instants, or update time instants to be set as a parameter, of the various channels, there are three options. A first option provides that the counter positions of all the transmission channels are updated at the same update time instant and are stored in the respective memories. A second option provides that the counter positions of all the transmission channels are all updated at equal intervals and stored in the respective memories. A third option provides that the counter positions of the various transmission channels are updated at mutually different update time intervals and are stored in the respective memories. In all cases, the instant of updating is no longer linked to the arrival of a data cell from the channel concerned but can take place at an autonomous instant which the designer of the equipment considers suitable.

From the point of view of processing capacity, the first option is unattractive since the counter position of all the transmission channels has to be updated simultaneously (at the same instant or within the same time slot) in which case it must be remembered that the 'leakage' value (or even the 'leakage' function) used to calculate the new counter position does not have to be the same for all the channels. It is better (option 2 and 3) to provide that the counter positions of the various transmission channels are updated at mutually different update time instants and are stored in the respective memories, as a result of which the processing capacity needed for altering the counter positions is division-multiplexed in time. The third option is of interest, in particular, if the various channels have very divergent 'leakage' values, which will in general be the case. As a result of updating the channels having a large 'leakage' more frequently, the additional memory needed for storing the counter position of said channels is limited. Incidentally more than one channel counter position may optionally be updated in each time slot; this depends, inter alia, on the processor capacity available therefor and on the complexity of, for example, the 'leakage' functions.

With regard to the processing taking place in each time slot, two options may be mentioned. A first option (parallel processing) provides that, as the first process, the storage of the counter position on the arrival of a data cell, the comparison with the threshold value and the granting or refusal of the access to the transmission medium to the data cell as a function thereof are carried out within a certain time slot and that, as a second process, the alteration of the update time instant of one or more transmission channels is also carried out within the same time slot, the first process and the second process being carried out simultaneously. A second option (serial processing) provides that, as the first process, the storage of the counter position on the arrival of a data cell, the comparison with the threshold value and the granting or refusal of access to the transmission medium to the data cell are carried out within a certain time slot and that, as the second process, the counter position (and the update time instant, if applicable) of one or more transmission channels is updated, the first process and the second process being carried out one after the other.

The first option (parallel processing) has the advantage that the entire time slot is available both for the first process (the updating of the counter position of the channel of the data cell which arrives at the monitoring apparatus in said time slot, the comparison of the updated counter position with the applicable threshold value and the admission or refusal of said data cell) and for the second process (the autonomous updating of the counter position of one or more (other) channels. An exact timing between the first (main) process and the second process will, however, require additional measures because of the so-called contention problem, which may occur if both the (data-cell-controlled) first process and the (autonomous, processor-controlled) second process have to be carried out within the same time slot for the same transmission channel. A solution to this contention problem may be that, if the first and the second process both relate fortuitously to the same channel, one of the processes can be omitted without too many disadvantages.

Using the second option (serial processing) avoids the contention problem altogether. However, the number of (autonomous) alterations of the update time instants and counter positions is more limited because of the more limited time in which said second process can be carried out, namely in the 'residual time' of the time slots. After all, use is made of one processor for both processes, while two (or even more) processes are used in parallel processing.

REFERENCE (Koninklijke PTT Nederland N.V.)

EXEMPLARY EMBODIMENTS

Figure 2:
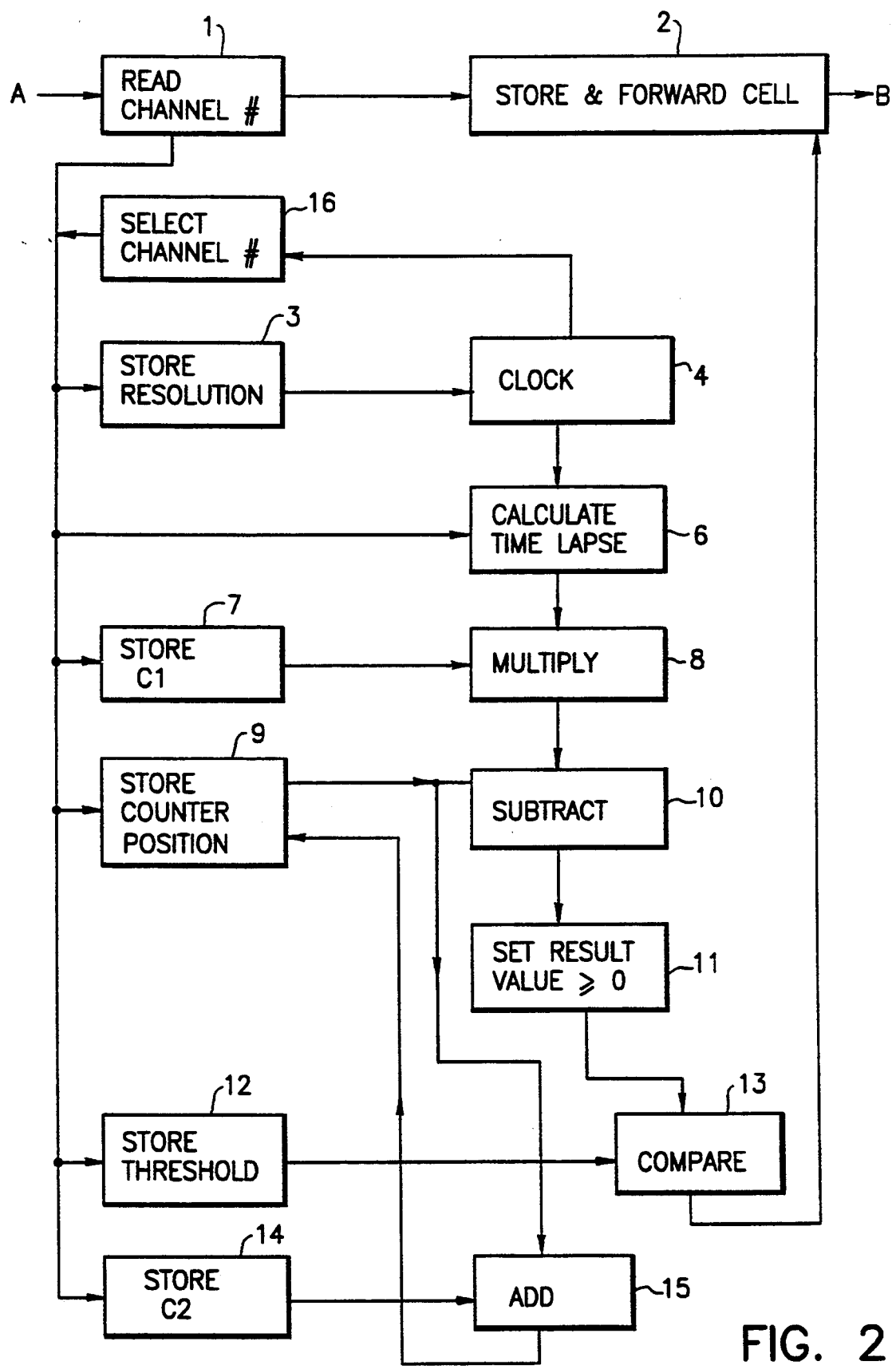

FIGS. 1 and 2 diagrammatically show two exemplary embodiments of a monitoring apparatus according to the invention, in which the method according to the invention is carried out. The exemplary embodiments shown largely correspond to the exemplary embodiment in said application EP-381275 by the Applicant, to which an apparatus is added for updating the counter position according to the invention described here. FIG. 1 relates to a design in which both the counter position and the update time instant are stored; FIG. 2 is a design in which only the counter position is stored for each channel, and for which the updating is carried out in accordance with a fixed pattern.

The monitoring apparatus shown in FIG. 1 and 2 comprises a read-out device 1, a switching device 2, five or six memory devices 3, 5, 7, 9, 12, 14, a time designation device 4 and a processor comprising five calculation devices 6, 8, 10, 11, 15, and a comparator device 13.

EXEMPLARY EMBODIMENT 1

Data cells which comprise a control word group and an information word group arrive successively at an input A of the monitoring apparatus. Located at this point is the read-out device 1, which derives the channel number from the control word group. The data cell itself is passed to the switching device 2 where the data cell is temporarily stored until a decision has been taken about whether or not to allow said data cell through to an output B of the switching device 2, to which output a downstream transmission network (not shown) is connected.

From the channel number, a directory is derived. With the aid of said directory, the memory devices 3, 7, 12, 14 supply the parameters which are specific for the channel concerned (said parameters are stored in the memory devices when the system is initialized). The first memory device 3 supplies a designation of the resolution with which the time has to be determined by the time designation device 4. Both the time of the last updating (stored as a variable in the memory device 5) and the information about the present time instant obtained from the time designation device 4 are fed to the first calculating device 6. The first calculating device 6 then determines how much time has elapsed between the data cell which was last to arrive (time instant t1) and the time instant of the last updating (time instant t0).

The second calculating device 8 multiplies the time elapsed (t) by a first constant value (C1, the 'leakage' value) supplied by the second memory device 7. Incidentally, if the first constant value (C1) is chosen as equal to 1, the second memory device 7 and the second calculating device 8 may be omitted. If powers of 2 are exclusively taken as the respective first constant values for the various channels, the multiplication can simply be carried out as a bit shift.

The value obtained in this way is subtracted by the third calculating device 10 from a value (counter position) stored in the fourth memory device 9 for said channel number. The fourth calculating device 11 ensures that the value obtained therefrom is not less than a certain minimum value (for example 0). The result obtained from the above is compared in the comparator device 13 with a special value supplied by the fifth memory device 12.

If the comparator device 13 concludes that the result is less than the threshold value, the following actions are carried out:

the switching device 2 receives an instruction to allow the data cell concerned through to the downstream transmission network via its output B.

The fifth calculating device 15 adds a second constant value, supplied by the sixth memory device 14, for said channel number to the information obtained earlier from the calculating device 11. The result obtained from the fifth calculating device 15 is written into the third memory device 9, the old value in said memory device 9 being overwritten.

The time instant of the arrival of the last data cell is stored, allowance being made for the resolution specified by the memory device 3, in memory device 5. If the comparator device 13 concludes that the result is greater than, or equal to, the threshold value, the following action is carried out:

the switching device 2 receives the instruction not to allow the data cell concerned through to the downstream network. In many implementations of networks, it is required in such a case that the position which has become vacant is replaced by a particular bit pattern which, for example, indicates an empty data cell; the switching device 2 then emits said bit pattern instead of the data cell concerned via its output B.

During initialization of the monitoring apparatus or of a transmission channel, the first memory device 3, the third memory device 7, the fifth memory device 12 and the sixth memory device 14 are filled, from the network control (not shown), with the parameters specific to the various channel numbers, as well as the fourth memory device 9 with the initial values (starting values) for the variables. For this purpose, said memory devices are provided with a setting facility which gives the network control access to the memory means without interfering with the actual operation of the monitoring circuit.

In this exemplary embodiment, the autonomous updating process proceeds as follows.

There is an indicator device 16 which specifies which channel directory is due to be updated. The data associated with the transmission channel indicated by the indicator device 16 are read out of the memory devices 3, 5, 7 and 9. Then, if necessary, the same calculations are carried out as those described above, with the proviso that a second constant value is not added (after all no data cell arrives). The recalculated counter position (result of 11) is written back into the memory device 9 and the instant at which the updating took place is stored, allowing for the resolution specified by the memory device 3, in the memory device 5. After the entire updating process has come to an end, the indicator device 16 is set to the next position; the control of this is not indicated in the diagram (nor is the subsequent control). The sequence in which the indicator device 16 indicates the various channels is to be chosen completely at random. Preferably, the sequence is chosen in such a manner that it can be guaranteed that each channel is updated at least once in each 'update' period. In that case, memory device 5 does not need to be larger than the number of bits needed to cover the 'update' period.

EXEMPLARY EMBODIMENT 2

FIG. 2 shows an exemplary embodiment which functions in accordance with the principle of updates in a fixed pattern. In this simple example, it has been chosen to update each channel at the instant when the time designation device 4 specifies the corresponding directory number. Compared with exemplary embodiment 1, memory device 5 (for storing the instant of the last update) is absent and indicator device 16 is now permanently coupled to (or derived from) the time designation device 4. When a data cell arrives, the same operations are carried out as in exemplary embodiment 1, with the proviso that (since memory device 5 is absent), the time which has elapsed since the last update can be derived directly by calculating device 6 from the difference between the state of the time designation device 4 and the channel directory supplied by 1. If the data cell is allowed through to the network, moreover, the result from calculating device 11 is not increased, but the counter position stored in memory device 9 is increased by the second constant value supplied by memory device 14. Now the 'current' counter position is not increased but it is, as it were, calculated back to a memory state valid at the last update instant, so that memory device 9 now has to be able to process larger counter positions than in exemplary embodiment 1. In many cases, the additional memory necessary for this purpose is smaller than the saving obtained by the omission of memory device 5.

It is pointed out that, in the exemplary embodiments described above, the two processes, the updating of the counter position after the arrival of a data cell, the decision on the basis of the threshold value as to whether the data cell is allowed through to the transmission medium B or refused, and the storage of the updated counter position is are carried out first by the processor, while the second process, the updating of the counter position of the transmission channel indicated by the indicator device 16 is carried out thereafter. All this takes place within one time slot. It is also possible for yet one more, or even more, counter positions to be updated in the 'residual' time of the time slot. It is attractive per se to update as many counter positions as possible (that is to say of various channels) because the update period and the memory required for memory device 5 or the additional memory for memory device 9 are consequently limited. Of course, on the other hand, the time slots will have a limited size because of the transmission speed. The choice of these features therefore depends on the processors and the transmission speed.

We claim:

1. Method of transferring, via a transmission medium comprising a plurality of virtual, asynchronously time-division-multiplexed transmission channels, a data stream fed to said transmission medium and comprised of data cells which are each transferred via one of said transmission channels and which each contain a channel designation indicating transmission channel via which said data cell has to be transferred, in which method a monitoring apparatus at the beginning of the transmission medium stores, for each transmission channel, a variable value which, when a data cell arrives at said monitoring apparatus, is amended as a function of the time which has elapsed from a reference time instant known at the monitoring apparatus, which amended variable value is then compared with a threshold value and, depending on the amended variable value and said threshold value, access to the downstream transmission medium is granted or refused to said data cell, wherein said reference time instant is set by the monitoring apparatus in a complete or at least partial independence of the instants of time of the appearance of the data cells.

2. Method according to claim 1, wherein the monitoring apparatus shifts the reference time instants of the respective transmission channels in time in accordance with a fixed sequence schedule to produce shifted reference time instants, and stores those shifted reference time instants and altered variable values associated therewith, said altered variable values being altered in conformity with a respective time shift.

3. Method according to claim 1, wherein the monitoring apparatus shifts the reference time instants of the respective transmission channels in time in accordance with a fixed time schedule and stores altered variable values associated therewith, said altered variable values being altered in conformity with a respective time shift.

* * * * *